(12) United States Patent
Joo et al.

(10) Patent No.: US 10,808,588 B2
(45) Date of Patent: Oct. 20, 2020

(54) AFTER TREATMENT SYSTEM AND AFTER TREATMENT METHOD FOR LEAN-BURN ENGINE

(71) Applicants: Hyundai Motor Company, Seoul (KR); KIA Motors Corporation, Seoul (KR)

(72) Inventors: Nahm Roh Joo, Gyeonggi-do (KR); ChangHo Jung, Gyeonggi-do (KR); Chang Hwan Kim, Gyeonggi-do (KR); Dohyung Kim, Gyeongsangbuk-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 121 days.

(21) Appl. No.: 16/263,558

(22) Filed: Jan. 31, 2019

(65) Prior Publication Data

US 2020/0248607 A1    Aug. 6, 2020

(51) Int. Cl.
*F01N 3/20*    (2006.01)
*F01N 3/10*    (2006.01)
*B01D 53/94*    (2006.01)

(52) U.S. Cl.
CPC .......... *F01N 3/2073* (2013.01); *F01N 3/101* (2013.01); *F01N 3/103* (2013.01); *F01N 3/208* (2013.01); *B01D 53/945* (2013.01); *B01D 53/9477* (2013.01); *B01D 53/9481* (2013.01); *B01D 53/9495* (2013.01); *B01D 2255/40* (2013.01); *B01D 2255/904* (2013.01); *B01D 2255/908* (2013.01); *B01D 2255/911* (2013.01); *B01D 2258/012* (2013.01); *F01N 2610/02* (2013.01); *F01N 2900/1404* (2013.01); *F01N 2900/1622* (2013.01); *F01N 2900/1624* (2013.01)

(58) Field of Classification Search
CPC ........ F01N 3/101; F01N 3/2066; F01N 3/208; F01N 3/2073; F01N 2240/25; F01N 2610/02; F01N 2900/1622
See application file for complete search history.

(56) References Cited

U.S. PATENT DOCUMENTS

| 8,381,512 | B2 * | 2/2013 | Brinkman ............... F01N 3/035 60/285 |
| 2010/0043402 | A1 | 2/2010 | Perry et al. |
| 2010/0107606 | A1 * | 5/2010 | Narayanaswamy .. F02D 41/146 60/274 |
| 2010/0139248 | A1 | 6/2010 | Najt et al. |
| 2010/0212295 | A1 | 8/2010 | Narayanaswamy et al. |
| 2010/0326052 | A1 | 12/2010 | Sun |
| 2011/0202253 | A1 | 8/2011 | Perry et al. |
| 2011/0288750 | A1 | 11/2011 | Wermuth et al. |

(Continued)

*Primary Examiner* — Jonathan R Matthias
(74) *Attorney, Agent, or Firm* — Brinks Gilson & Lione

(57) ABSTRACT

An after treatment method for a lean-burn engine is disclosed. The after treatment method is configured to control an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine. $NH_3$ generation in the ammonia production catalyst module is changed according to a temperature and a temperature change rate of the SCR catalyst.

19 Claims, 8 Drawing Sheets

(56) References Cited

U.S. PATENT DOCUMENTS

| | | | |
|---|---|---|---|
| 2012/0060472 A1 | 3/2012 | Li et al. | |
| 2014/0102081 A1* | 4/2014 | Toner | F01N 3/101 60/295 |
| 2014/0356237 A1* | 12/2014 | Sakurai | F01N 3/2073 422/111 |
| 2018/0171910 A1* | 6/2018 | Tanaka | B01D 53/9422 |

* cited by examiner

AFTER TREATMENT SYSTEM AND AFTER TREATMENT METHOD FOR LEAN-BURN ENGINE

FIELD

The present disclosure relates to an after treatment system and an after treatment method for a lean-burn engine

BACKGROUND

The statements in this section merely provide background information related to the present disclosure and may not constitute prior art.

Vehicles may be provided with at least one catalytic converter for reducing emission (EM) contained in an exhaust gas. The exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the air through a tail pipe. The catalytic converter purifies the EM contained in the exhaust gas. In addition, a particulate filter for trapping particulate matter (PM) in the exhaust gas is mounted in the exhaust pipe.

A three-way catalyst (TWC) is one type of the catalytic converter and reacts with hydrocarbon (HC) compounds, carbon monoxide (CO) and nitrogen oxides (NOx), which are harmful components of the exhaust gas, to remove these compounds. The TWCs are mainly installed in gasoline vehicles, and Pt/Rh, Pd/Rh or Pt/Pd/Rh systems are used as the TWCs.

A lean-burn engine among gasoline engines improves fuel efficiency by burning a lean air/fuel mixture. The lean-burn engine burns the lean air/fuel mixture, so air/fuel ratio (AFR) of the exhaust gas is also lean. However, when the AFR is lean, the TWC slips the NOx without sufficiently reducing all of the NOx contained in the exhaust gas. Accordingly, a vehicle equipped with the lean-burn engine may include a selective catalytic reduction (SCR) catalyst for purifying the NOx slipped from the TWC. The SCR catalyst used in the vehicle equipped with the lean-burn engine may be a passive type SCR catalyst.

When the AFR is rich, the TWC may reduce the NOx to produce NH3 and the NH3 generated in the TWC is stored in the passive type SCR catalyst. When the AFR is lean, the passive type SCR catalyst purifies the NOx contained in the exhaust gas using the stored $NH_3$.

Even in the vehicles equipped with the lean burn engine, the engine is operated at a stoichiometric AFR under high-speed/high-load conditions. When the engine is operated at the stoichiometric AFR under the high-speed/high-load conditions, a temperature of the TWC disposed close to the engine may rise to 1,000° C. and a temperature of the SCR catalyst may rise to 700° C. As the temperature of the SCR catalyst rises, the ammonia storage capacity of the SCR catalyst decreases. For example, if the temperature of the SCR catalyst is above 500° C., the SCR catalyst rarely stores the $NH_3$. Therefore, if the temperature of the SCR catalyst rises to 400° C. or higher, the $NH_3$ stored in the SCR catalyst slips. Even if load of the engine is reduced in this state, the NOx contained in the exhaust gas cannot be purified, so that it is difficult to enter a lean AFR.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an after treatment system and an after treatment method for a lean-burn engine having advantages of controlling $NH_3$ amount generated in an ammonia production catalyst module according to a temperature and a temperature change rate of an SCR catalyst.

Another aspect of the present disclosure provides an after treatment system and an after treatment method for a lean-burn engine having further advantages of reducing $NH_3$ amount slipped from an SCR catalyst.

Yet another aspect of the present disclosure provides an after treatment system and an after treatment method for a lean-burn engine having further advantages of improving fuel economy and reducing emissions by efficiently generating $NH_3$.

An after treatment system for a lean-burn engine according to an aspect of the present disclosure may include: an exhaust pipe connected to the lean-burn engine and through which an exhaust gas generated in the lean-burn engine flows; an ammonia production catalyst module mounted on the exhaust pipe, capable of purifying emission contained in the exhaust gas, and generating ammonia ($NH_3$) using nitrogen oxide (NOx) contained in the exhaust gas or the NOx stored therein at a rich air/fuel ratio (AFR); a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$; and a controller detecting information on the AFR and temperature of the exhaust gas and controlling the AFR of the exhaust gas based on the information on the AFR and the temperature of the exhaust gas, wherein the controller controls a rich duration and a target rich AFR such that a target $NH_3$ amount is stored in the SCR catalyst in response to detecting that $NH_3$ generation is necessary or desired, and wherein the target $NH_3$ amount is controlled according to a temperature and a temperature change rate of the SCR catalyst.

The target $NH_3$ amount may be a first target $NH_3$ amount if the temperature of the SCR catalyst is lower than a first predetermined temperature.

The first target $NH_3$ amount may be between 10% and 50% of an increased or maximum amount of the $NH_3$ that can be stored in the SCR catalyst at the first predetermined temperature.

The target $NH_3$ amount may be a second target $NH_3$ amount that is less than the first target $NH_3$ amount if the temperature of the SCR catalyst is higher than or equal to the first predetermined temperature and is lower than a second predetermined temperature and the temperature change rate of the SCR catalyst is 0 or negative value.

The second target $NH_3$ amount may be 40%-60% of the first target $NH_3$ amount.

The target $NH_3$ amount may be 0 if the temperature of the SCR catalyst is higher than or equal to the first predetermined temperature and is lower than the second predetermined temperature and the temperature change rate of the SCR catalyst is positive value, or the temperature of the SCR catalyst is higher than or equal to the second predetermined temperature.

The controller may operate the engine at a stoichiometric AFR if the $NH_3$ amount stored in the SCR catalyst becomes 0.

The ammonia production catalyst module may include at least one of a three-way catalyst (TWC), an ammonia production catalyst (APC), an additional TWC, and a lean NOx trap catalyst.

The after treatment system may further include a particulate filter mounted on the exhaust pipe and trapping particulate matter in the exhaust gas.

The after treatment system may further include a CO clean-up catalyst (CUC) mounted on the exhaust pipe downstream of the SCR catalyst and purifying carbon monoxide (CO) in the exhaust gas.

An after treatment method according to another aspect of the present disclosure is configured to control an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine.

The after treatment method may include: determining whether $NH_3$ generation is desired; determining whether a temperature of the SCR catalyst is higher than or equal to a first predetermined temperature and is lower than a second predetermined temperature if the $NH_3$ generation is necessary or desired; determining whether a temperature change rate of the SCR catalyst is positive value if the temperature of the SCR catalyst is higher than or equal to the first predetermined temperature and is lower than the second predetermined temperature; and consuming completely the NH3 stored in the SCR catalyst and operating the engine at a stoichiometric AFR if the temperature change rate of the SCR catalyst is positive value.

If the temperature of the SCR catalyst is lower than the first predetermined temperature, the after treatment method may further include: calculating a first rich duration for which a rich AFR is maintained and a first target rich AFR; and operating the engine at the first target rich AFR for the first rich duration.

The $NH_3$ amount stored in the SCR catalyst may become a first target $NH_3$ amount if the engine is operated at the first target rich AFR for the first rich duration.

The first target $NH_3$ amount may be between 10% and 50% of an increased or maximum amount of the $NH_3$ that can be stored in the SCR catalyst at the first predetermined temperature.

The first rich duration may be calculated according to the first target rich AFR and a temperature of the CUC.

If the temperature of the SCR catalyst is higher than or equal to the first predetermined temperature and is lower than the second predetermined temperature and the temperature change rate of the SCR catalyst is 0 or negative value, the after treatment method may further include: calculating a second rich duration for which the rich AFR is maintained and a second target rich AFR; and operating the engine at the second target rich AFR for the second rich duration.

The $NH_3$ amount stored in the SCR catalyst may become a second target $NH_3$ amount that is less than the first target $NH_3$ amount if the engine is operated at the second target rich AFR for the second rich duration.

The second target $NH_3$ amount may be 40%-60% of the first target $NH_3$ amount.

The second rich duration may be calculated according to the second target rich AFR and a temperature of the CUC.

According to the present disclosure, the $NH_3$ amount generated in the ammonia generating catalyst module can be controlled according to the temperature and the temperature change rate of the SCR catalyst. Therefore, since undesired $NH_3$ is not generated, the amount of the $NH_3$ slipped from the SCR catalyst can be reduced and the fuel economy can be improved.

In addition, other effects of the aspects of the present disclosure should be directly or implicitly described in the description provided herein. Various effects predicted according to the aspects of the present disclosure will be disclosed in the description provided herein.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
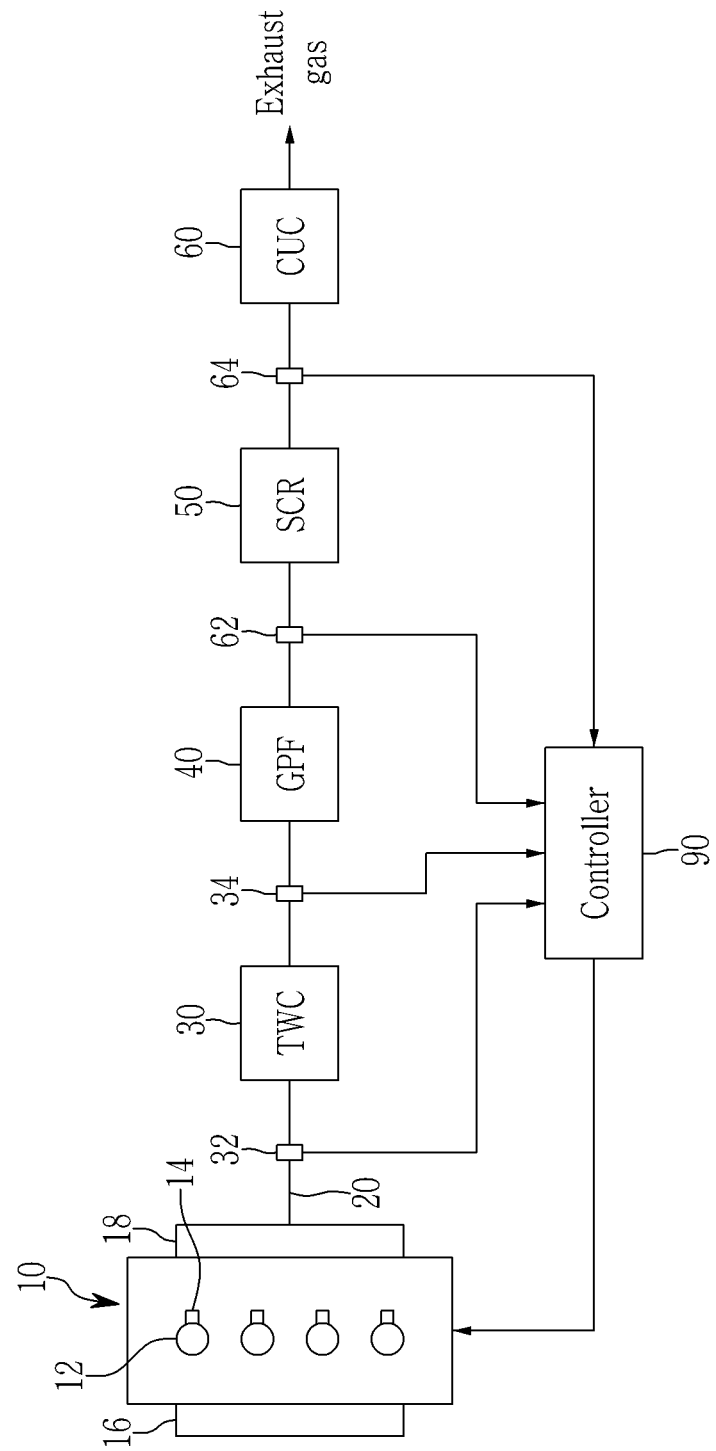
FIG. 1 is a schematic diagram of an after treatment system for a lean-burn engine according to an aspect of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The terminology used herein is for the purpose of describing particular aspects only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

It is understood that the term "vehicle," "vehicular," "car," or other similar term as used herein is inclusive of motor vehicles, in general, such as passenger automobiles including sports utility vehicles (SUV), buses, trucks, various commercial vehicles, watercraft including a variety of boats and ships, aircraft, and the like, and includes hybrid vehicles, electric vehicles, hybrid electric vehicles, hydrogen-powered vehicles and other alternative fuel vehicles (e.g., fuels derived from resources other than petroleum).

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by a system comprising the controller, as described in detail below.

Furthermore, the controller of the present disclosure may be embodied as non-transitory computer readable media containing executable program instructions executed by a processor or the like. Examples of the computer readable mediums include, but are not limited to, ROM, RAM, compact disc (CD)-ROMs, magnetic tapes, floppy disks, flash drives, smart cards, and optical data storage devices. The computer readable recording medium can also be distributed throughout a computer network so that the program instructions are stored and executed in a distributed fashion, e.g., by a telematics server or a Controller Area Network (CAN).

Hereinafter, aspects of the present disclosure will be described in detail with reference to the accompanying drawings.

FIG. 1 is a schematic diagram of an after treatment system for a lean-burn engine according to an aspect of the present disclosure.

As shown in FIG. 1, an after treatment system according to an aspect of the present disclosure includes an engine 10, an exhaust pipe 20, a three-way catalyst (TWC) 30, a particulate filter (Gasoline Particulate Filter; GPF) 40, a selective catalytic reduction (SCR) catalyst 50, and a CO clean-up catalyst (CUC) 60.

The engine 10 burns an air/fuel mixture to convert chemical energy into mechanical energy. The engine 10 is connected to an intake manifold 16 to flow air into a combustion chamber 12. An exhaust gas generated in combustion process is collected in an exhaust manifold 18 and then flows out from the engine 10. The combustion chamber 12 is equipped with a spark plug 14 to ignite the air/fuel mixture within the combustion chamber 12. The engine 10 may be a gasoline engine. Depending on types of gasoline engines, fuel may be directly injected into the combustion chamber 12 or the air/fuel mixture may be supplied to the combustion chamber 12 via the intake manifold 16. In addition, the engine 10 may be a lean-burn engine. Therefore, the engine 10 operates at a lean air/fuel ratio (AFR) except for special driving conditions.

The exhaust pipe 20 is connected to the exhaust manifold 18 to discharge the exhaust gas to an outside of the vehicle. The exhaust pipe 20 is equipped with the TWC 30, the particulate filter 40, the SCR catalyst 50, and the CUC 60 to purify or remove emission and particulate matter contained in the exhaust gas.

The TWC 30 is disposed on the exhaust pipe 20 through which the exhaust gas discharged from the engine 10 flows, and harmful materials including CO, HC, and NOx contained in the exhaust gas are converted into harmless components by an oxidation-reaction reaction in the TWC 30. Particularly, the TWC 30 can reduce the NOx contained in the exhaust gas into $NH_3$ at the rich AFR. At this time, the TWC 30 may not purify the CO and the HC in the exhaust gas sufficiently and may slip the CO and the HC therefrom. In addition, the TWC 30 oxidizes the CO and the HC contained in the exhaust gas at the lean AFR. Generally, the TWC 30 can purify all of the CO, the HC, and the NOx at a stoichiometric AFR. Since the TWC 30 is well known to a person of an ordinary skill in the art, a detailed description thereof will be omitted.

The particulate filter 40 is mounted on the exhaust pipe 20 downstream of the TWC 30, traps the particulate matter contained in the exhaust gas, and burns the trapped particulate matter. The particulate filter 40 is provided with inlet cells and outlet cells alternately disposed in a housing, and a wall is disposed between the inlet cell and the outlet cell. The inlet cell has an end that is opened and the other end that is blocked, and the outlet cell has an end that is blocked and the other end that is opened. The exhaust gas flows into the particulate filter 40 through the opened end of the inlet cell, flows to the outlet cell through the wall, and flows out to an outside of the particulate filter 40 through the opened end of the outlet cell. When the exhaust gas passes through the wall, the particulate filter contained in the exhaust gas does not pass through the wall and remains in the inlet cell.

The SCR catalyst 50 is mounted on the exhaust pipe 20 downstream of the particulate filter 40. The SCR catalyst 50 stores the $NH_3$ generated in the TWC 30 at the rich AFR and reduces the NOx contained in the exhaust gas using the stored $NH_3$ at the lean AFR. This type of the SCR catalyst 50 may be referred to as a passive type SCR catalyst 50.

The SCR catalyst 50 may be composed of one or a combination of a zeolite catalyst and a metal catalyst supported in a porous $Al_2O_3$. At least one of Cu, Pt, Mn, Fe, Co, Ni, Zn, Cs and Ga may be ion-exchanged in the zeolite catalyst. In the metal catalyst supported in the porous $Al_2O_3$, at least one metal among Pt, Pd, Rh, Ir, Ru, W, Cr, Mn, Fe, Co, Cu, Zn and Ag may be supported in the porous $Al_2O_3$.

The CUC 60 is mounted on the exhaust pipe 20 downstream of the SCR catalyst 50. The CUC 60 purifies the CO contained in the exhaust gas. Particularly, the CO may be slipped from the TWC 30 at the rich AFR. Therefore, emission of the CO to the outside of the vehicle can be inhibited by disposing the CUC 60 at the most downstream of the after treatment system. The CUC 60 includes Pt, Pd, Rh, and Ba supported in $CeO_2$ and $Al_2O_3$.

In one aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-10 wt % of an additive based on a total weight of the CUC 60.

In another aspect, the CUC 60 includes 0.2-1.5 wt % of Pt, 0-0.4 wt % of Pd, 0-0.4 wt % of Rh, 0-5.0 wt % of Ba, 40-90 wt % of $CeO_2$, 9.8-59.8 wt % of $Al_2O_3$, and 0-20 wt % of an additive based on a total weight of the CUC 60.

The additive is added for improving performance of the $CeO_2$ and the $Al_2O_3$ and includes at least one of La, Zr, Mg and Pr.

The CUC 60 is mainly composed of Pt—CeO2. Here, the Pt functions to oxidize the CO, and the $CeO_2$ contains an oxygen storage material having oxygen storage capacity (OSC) to help oxidation of the CO at low temperature at the lean AFR. $Pd/Al_2O_3$ also plays a role similar to the Pt/CeO2, but an amount of the $Pt/CeO_2$ is greater than that of the $Pd/Al_2O_3$ may be used in order to improve oxidation ability at low temperature.

The Ba contained in the CUC 60 functions to remove a small amount of the NOx that is not removed from the SCR catalyst 50 when the AFR is rich.

The Rh included in the CUC 60 is intended to promote reduction of the NOx when the AFR is rich.

The exhaust pipe 20 may be equipped with a plurality of sensors 32, 34, 62, and 64 for detecting the AFR of the exhaust gas and operation of the catalysts 30, 40, 50 and 60.

A first oxygen sensor 32 is mounted on the exhaust pipe 20 at an upstream of the TWC 30, detects $O_2$ concentration in the exhaust gas at the upstream of the TWC 30, and transmits a signal corresponding thereto to a controller 90. The AFR (it will hereinafter be referred to as 'λ') of the exhaust gas described herein may refer to a value detected by the first oxygen sensor 32. In addition, an AFR control described here may refer to controlling the AFR of the exhaust gas to be a target AFR.

A second oxygen sensor 34 is mounted on the exhaust pipe 20 at the downstream of the TWC 30, detects $O_2$ concentration in the exhaust gas at the downstream of the TWC 30, and transmits a signal corresponding thereto to the controller 90.

A first temperature sensor 62 is mounted on the exhaust pipe 20 at an upstream of the SCR catalyst 50, detects a temperature of the exhaust gas at the upstream of the SCR catalyst 50, and transmits a signal corresponding thereto to the controller 90.

A second temperature sensor 64 is mounted on the exhaust pipe 20 at the downstream of the SCR catalyst 50, detects the temperature of the exhaust gas at the downstream of the SCR catalyst 50, and transmits a signal corresponding thereto to the controller 90.

Figure 7:
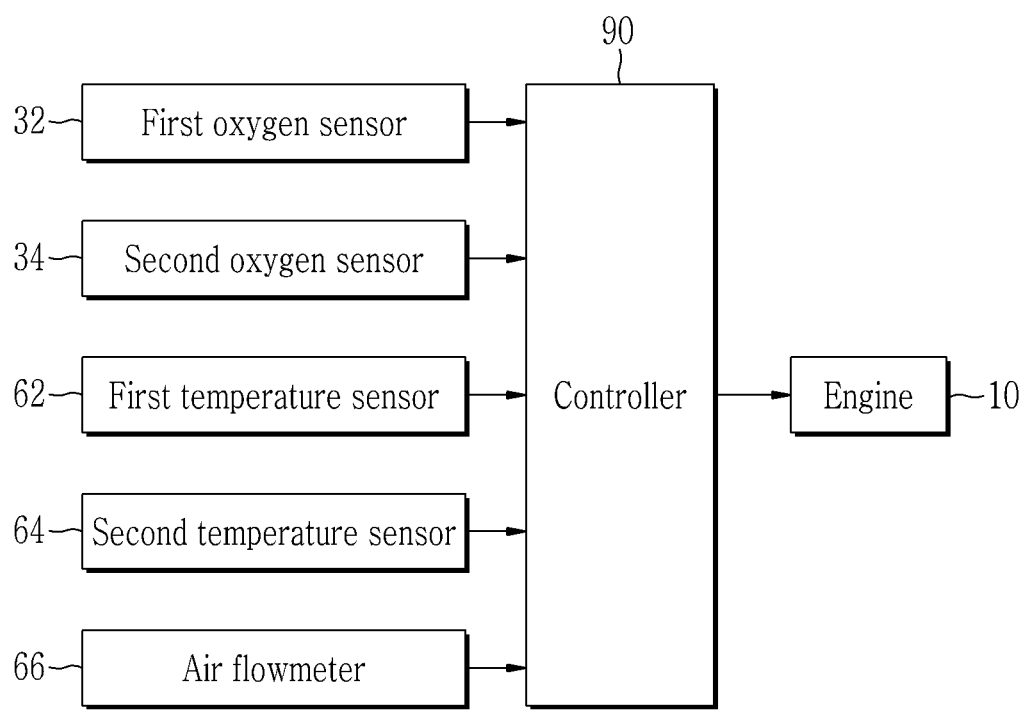
FIG. 7 is a block diagram of an after treatment system for a lean-burn engine according to an aspect of the present disclosure.

In addition to the sensors 32, 34, 62, and 64 described herein, the after treatment system may further include various sensors. For example, additional temperature sensors can be mounted on the exhaust pipe 20 at the upstream and the downstream of the TWC 30 to detect the temperature of the exhaust gas at the upstream and the downstream of the TWC 30, respectively. In addition, as shown in FIG. 7, the after treatment system may further include an air flowmeter 66. Further, the after treatment system may further include a NOx sensor, an HC sensor or a CO sensor mounted on the exhaust pipe 20, and concentration of emission contained in the exhaust gas can be detected via these sensors.

The controller 90 is electrically connected to the sensors 32, 34, 62, 64 and 66 to receive the signals corresponding to the detected values by the sensors 32, 34, 62, 64 and 66, and determines driving condition of the vehicle, the AFR, and the temperatures of the catalysts 30, 40, 50, and 60 based on the signals. The controller 90 can control ignition timing, fuel injection timing, fuel amount, etc., by controlling the engine 10 based on the determination results. The controller 90 may be implemented with at least one processor executed by a predetermined program and the predetermined program may be programmed to perform each step of an after treatment method according to an aspect of the present disclosure.

Figure 2:
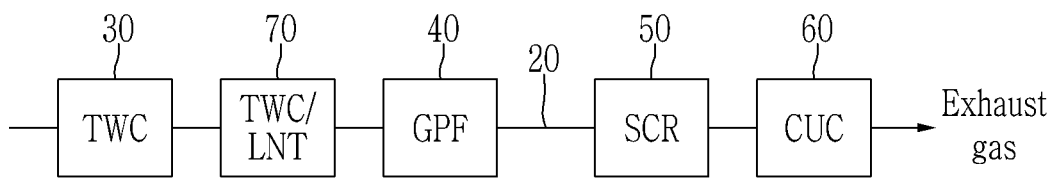
FIG. 2 is a schematic diagram of an after treatment system for a lean-burn engine according to another aspect of the present disclosure.

FIG. 2 is a schematic diagram of an after treatment system for a lean-burn engine according to another aspect of the present disclosure. The after treatment system shown in FIG. 2 is a modification of the after treatment system shown in FIG. 1.

As shown in FIG. 2, the after treatment system according to another aspect of the present disclosure is equipped with the TWC 30, an additional TWC 70, the particulate filter 40, the SCR catalyst 50, and the CUC 60 sequentially disposed on the exhaust pipe 20. Since the TWC 30, the particulate filter 40, the SCR catalyst 50, and the CUC 60 are described above, a detailed description thereof will be omitted.

The additional TWC 70 is disposed on the exhaust pipe 20 between the TWC 30 and the particulate filter 40. The additional TWC 70 basically performs the same function as the TWC 30. In other words, the additional TWC 70 converts harmful materials including the CO, the HC, and the NOx contained in the exhaust gas into harmless components by oxidation-reaction reaction. In addition, the additional TWC 70 increases the amount of $NH_3$ supplied to the SCR catalyst 50 by reducing the NOx contained in the exhaust gas into $NH_3$ when the AFR is rich. In addition, a lean NOx trap (LNT) catalyst may be further coated in the additional TWC 70 and the TWC 30. The LNT catalyst absorbs the NOx at the lean AFR, and releases the absorbed NOx and reduces the released NOx into the $N_2$ gas or the $NH_3$ at the rich AFR. Thus, the LNT catalyst assists the TWC having low NOx purification performance at the lean AFR. The LNT catalyst includes at least one or a combination of an alkali metal including K, Na, Li, and Cs, an alkaline earth metal including Ba and Ca, a rare earth metal including Ir and La, and a noble metal including Pt, Pd, and Rh.

Figure 3:
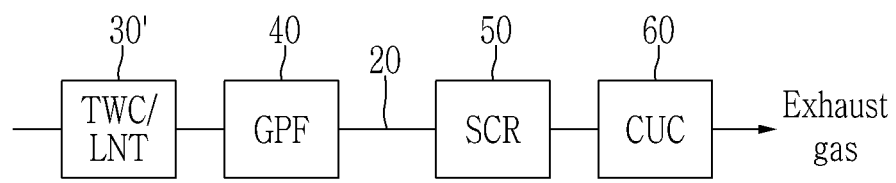
FIG. 3 is a schematic diagram of an after treatment system for a lean-burn engine according to another aspect of the present disclosure.

FIG. 3 is a schematic diagram of an after treatment system for a lean-burn engine according to another aspect of the present disclosure. The after treatment system shown in FIG. 3 uses a TWC 30' coated with the LNT catalyst instead of the TWC 30 in the after treatment system shown in FIG. 1. Since the after treatment system shown in FIG. 1 and the TWC 30' coated with the LNT catalyst are described above, a detailed description thereof will be omitted.

Figure 4:
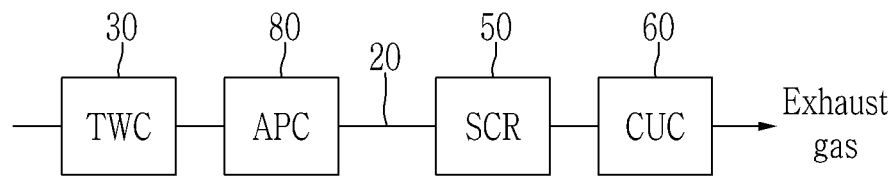
FIG. 4 is a schematic diagram of an after treatment system for a lean-burn engine according to another aspect of the present disclosure.

FIG. 4 is a schematic diagram of an after treatment system for a lean-burn engine according to another aspect of the present disclosure. The after treatment system shown in FIG. 4 is a modification of the after treatment system shown in FIG. 1.

As shown in FIG. 4, the after treatment system according to other aspect of the present disclosure is equipped with the TWC 30, an ammonia production catalyst (APU) 80, the SCR catalyst 50, and the CUC 60 sequentially disposed on the exhaust pipe 20. Since the TWC 30, the SCR catalyst 50, and the CUC 60 are described above, a detailed description thereof will be omitted.

The APC 80 is disposed at the exhaust pipe 20 at the downstream of the TWC 30. The APC 80 stores the NOx contained in the exhaust gas at the lean AFR, and generates $H_2$ to release the stored NOx and generates $NH_3$ using the released NOx and the generated $H_2$.

In one aspect, the APC 80 includes 0.4-0.9 wt % of Pt, 0.057-0.3 wt % of Pd, 0.03-0.1 wt % of Rh, 5.0-15.0 wt % of Ba, 10-30 wt % of $CeO_2$, 48.7-84.513 wt % of a composite of MgO and $Al_2O_3$, and 0-5 wt % of an additive based on a total weight of the APC 40.

In another aspect, the APC 80 includes 0.4-0.9 wt % of Pt, 0.057-0.3 wt % of Pd, 0.03-0.1 wt % of Rh, 5.0-15.0 wt % of Ba, 10-25 wt % of $CeO_2$, 48.7-79.513 wt % of the composite of MgO and $Al_2O_3$, and 0-10 wt % of the additive based on the total weight of the APC.

The additive is added for the performance improvement of $CeO_2$ and $Al_2O_3$ and includes at least one of La, Zr, Mg and Pr.

The Pt contained in the APC 80 functions to oxidize the NOx for the APC 80 to store the NOx. In addition, the Pt increases an amount of $H_2$ generated in the APC 80.

The Pd contained in the APC 80 improves heat resistance of the APC 80. Since the APC 80 is disposed close to the engine 10, a temperature of the APC 80 can rise to 950° C. Therefore, the Pd is added in the APC 80 to improve heat resistance.

In order to increase the $NH_3$ generation and the $H_2$ generation, a weight ratio of the Pt to the Pd in the APC 80 may be 3:1-7:1. The weight ratio of the Pt to the Pd in the APC 80 may be 3:1-5:1.

The Rh contained in the APC 80 purifies the NOx contained in the exhaust gas at the stoichiometric AFR.

The Ba and the $CeO_2$ contained in the APC 80 is configured to store the NOx in nitrate form.

In addition, the $CeO_2$ increases $H_2$ generation. However, if the APC 80 contains large amounts of the $CeO_2$, the generated $NH_3$ can be reoxidized. Thus, the APC 80 may include 10-30 wt % of $CeO_2$ based on a total weight of the APC 80.

The composite of MgO and $Al_2O_3$ contained in the APC 80 functions as a substrate. The composite of MgO and $Al_2O_3$ may include 15-25 wt % of MgO based on a total weight of the composite of MgO and $Al_2O_3$. The MgO enhances thermal stability of the Ba.

Figure 5:
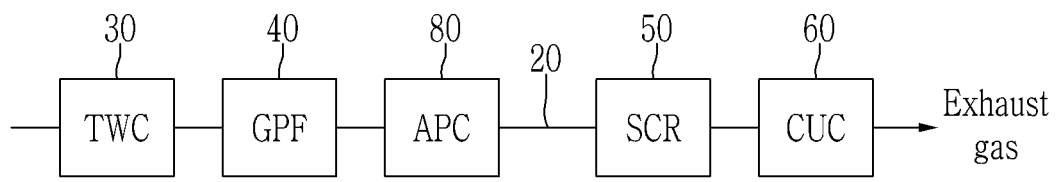
FIG. 5 is a schematic diagram of an after treatment system for a lean-burn engine according to another aspect of the present disclosure.

FIG. 5 is a schematic diagram of an after treatment system for a lean-burn engine according to another aspect of the present disclosure. The after treatment system shown in FIG. 5 is a modification of the after treatment system shown in FIG. 4.

As shown in FIG. 5, the after treatment system according to other aspect of the present disclosure is equipped with the TWC 30, the particulate filter 40, the APC 80, the SCR catalyst 50, and the CUC 60 sequentially disposed on the exhaust pipe 20. Since the TWC 30, the particulate filter 40, the APC 80, the SCR catalyst 50, and the CUC 60 are described above, a detailed description thereof will be omitted.

Figure 6:
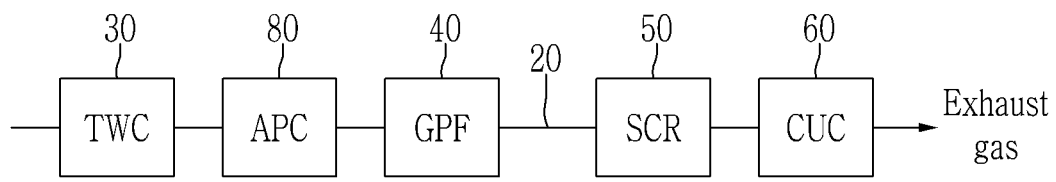
FIG. 6 is a schematic diagram of an after treatment system for a lean-burn engine according to another aspect of the present disclosure.

FIG. 6 is a schematic diagram of an after treatment system for a lean-burn engine according to another aspect of the present disclosure. The after treatment system shown in FIG. 6 is a modification of the after treatment system shown in FIG. 4.

As shown in FIG. 6, the after treatment system according to other aspect of the present disclosure is equipped with the TWC 30, the APC 80, the particulate filter 40, the SCR catalyst 50, and the CUC 60 sequentially disposed on the exhaust pipe 20. Since the TWC 30, the APC 80, the particulate filter 40, the SCR catalyst 50, and the CUC 60 are described above, a detailed description thereof will be omitted.

According to the aspects of the present disclosure, catalysts (e.g., the TWC, the additional TWC, the LNT, the APC, etc.) which can generate the $NH_3$ at the rich AFR is disposed at a front end portion of the after treatment system, the SCR catalyst which stores the $NH_3$ and purifies the NOx using the stored $NH_3$ is disposed at a middle portion of the after treatment system, and the CUC is disposed at the rear end portion of the after treatment system. Therefore, purifying performance for the emissions contained in the exhaust gas can be improved.

In this specification, the catalysts capable of purifying the emissions in the exhaust gas and generating the $NH_3$ using the NOx contained in the exhaust gas or stored therein at the rich AFR (in particular, the catalysts disposed at the upstream of the SCR catalyst) will be referred to as the ammonia production catalyst module. That is, the ammonia production catalyst module may include at least one of the TWC, the APC, the additional TWC, and the LNT catalyst. In addition, the ammonia production catalyst module contains an oxygen storage material having oxygen storage capacity (OSC).

FIG. 7 is a block diagram of an after treatment system for a lean-burn engine according to an aspect of the present disclosure.

FIG. 7 illustrates a simple example of inputs and outputs of the controller 90 to implement the after treatment system according to aspects of the present disclosure. It should be understood that the inputs and the outputs of the controller 90 according to aspects of the present disclosure are not limited to the example illustrated in FIG. 7.

As shown in FIG. 7, the controller 90 is electrically connected to the first and second oxygen sensors 32 and 34, the first and second temperature sensors 62 and a 64, and the air flowmeter 66, and receives the signals corresponding to the values detected by the sensors 32, 34, 62, 64 and 66.

The first oxygen sensor 32 detects the concentration of the $O_2$ contained in the exhaust gas at the upstream of the TWC 30 and transmits the signal corresponding thereto to the controller 90. The second oxygen sensor 34 detects the concentration of the $O_2$ contained in the exhaust gas at the downstream of the TWC 30 and transmits the signal corresponding thereto to the controller 90. The controller 90 can determine whether the TWC 30 is operating normally based on the signals of the first and second oxygen sensors 32 and 34, and performs the AFR control of the engine 10.

The first temperature sensor 62 detects the temperature of the exhaust gas at the upstream of the SCR catalyst 50 and transmits the signal corresponding thereto to the controller 90. The second temperature sensor 64 detects the temperature of the exhaust gas at the downstream of the SCR catalyst 50 and transmits the signal corresponding thereto to the controller 90. The controller 90 can calculate the temperatures of the TWC 30, the particulate filter 40, the SCR catalyst 50 and the CUC 60 based on the signals of the first and second temperature sensors 62 and 64.

The air flowmeter 66 is mounted on an intake pipe or an intake duct to detect the amount of the air flowing into the intake system, and transmits the signal corresponding thereto to the controller 90.

The controller 90 controls operation of the engine 10 based on the values detected by the sensors 32, 34, 62, 64, and 66. That is, the controller 90 can adjust the fuel injection amount to adjust the target AFR, and can delay the ignition timing for warming up the catalysts 30, 40, 50 and 60. In addition, the controller 90, in response to detecting that $NH_3$ generation is necessary or desired, controls a rich duration and a target rich AFR such that the NH3 stored in the SCR catalyst 50 becomes a target NH$_3$ amount. The target NH$_3$ amount can be controlled according to the temperature and a temperature change rate of the SCR catalyst 50.

Figure 8:
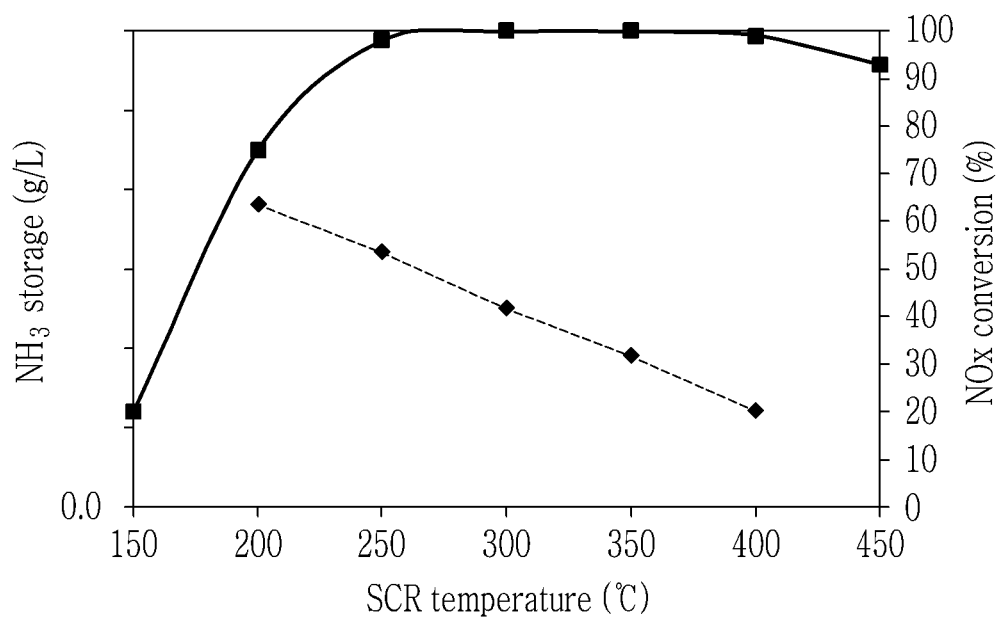
FIG. 8 is a graph showing $NH_3$ amount stored in an SCR catalyst and NOx purification efficiency of the SCR catalyst according to a temperature of the SCR catalyst.

FIG. 8 is a graph showing NH$_3$ amount stored in an SCR catalyst and NOx purification efficiency of the SCR catalyst according to a temperature of the SCR catalyst.

In FIG. 8, a solid line represents the NOx purification efficiency of the SCR catalyst 50, and a dotted line represents NH$_3$ amount stored in the SCR catalyst 50.

As shown in FIG. 8, when the temperature of the SCR catalyst 50 is 200° C., an increased or maximum amount of the NH$_3$ is stored in the SCR catalyst 50, and as the temperature of the SCR catalyst 50 is increased, the NH$_3$ amount stored in the SCR catalyst 50 is reduced.

However, the NOx purification efficiency of the SCR catalyst 50 is close to 100% at the temperature of the SCR catalyst 50 of 250° C. to 400° C.

If the temperature of the SCR catalyst 50 is lower than 250° C., the NH$_3$ amount stored in the SCR catalyst 50 is great but the NOx purification efficiency of the SCR catalyst 50 is low. Therefore, the SCR catalyst 50 does not efficiently purify the NOx in the exhaust gas.

If the temperature of the SCR catalyst 50 is higher than 400° C., the NOx purification efficiency of the SCR catalyst 50 is high but the NH$_3$ amount stored in the SCR catalyst 50 is small. Therefore, the SCR catalyst 50 does not efficiently purify the NOx in the exhaust gas. In this case, even if the NH$_3$ is generated in the ammonia production catalyst module 30, 30', 70, or 80, the NH$_3$ is not stored in the SCR catalyst 50 but is slipped from the SCR catalyst 50. Therefore, if the temperature of the SCR catalyst 50 is higher than 400° C. or reaches 400° C., the engine 10 is controlled such that the ammonia production catalyst module 30, 30', 70, or 80 does not generate the NH$_3$ according to the aspects of the present disclosure.

An after treatment method according to an aspect of the present disclosure will hereinafter be described in detail. For convenience of description, a method of controlling the after treatment system illustrated in FIG. 1 will be exemplified. However, it should be understood that the after treatment method according to the aspect of the present disclosure can be applied to the after treatment system shown in FIG. 2 to FIG. 6 with appropriate modification.

Figure 9:
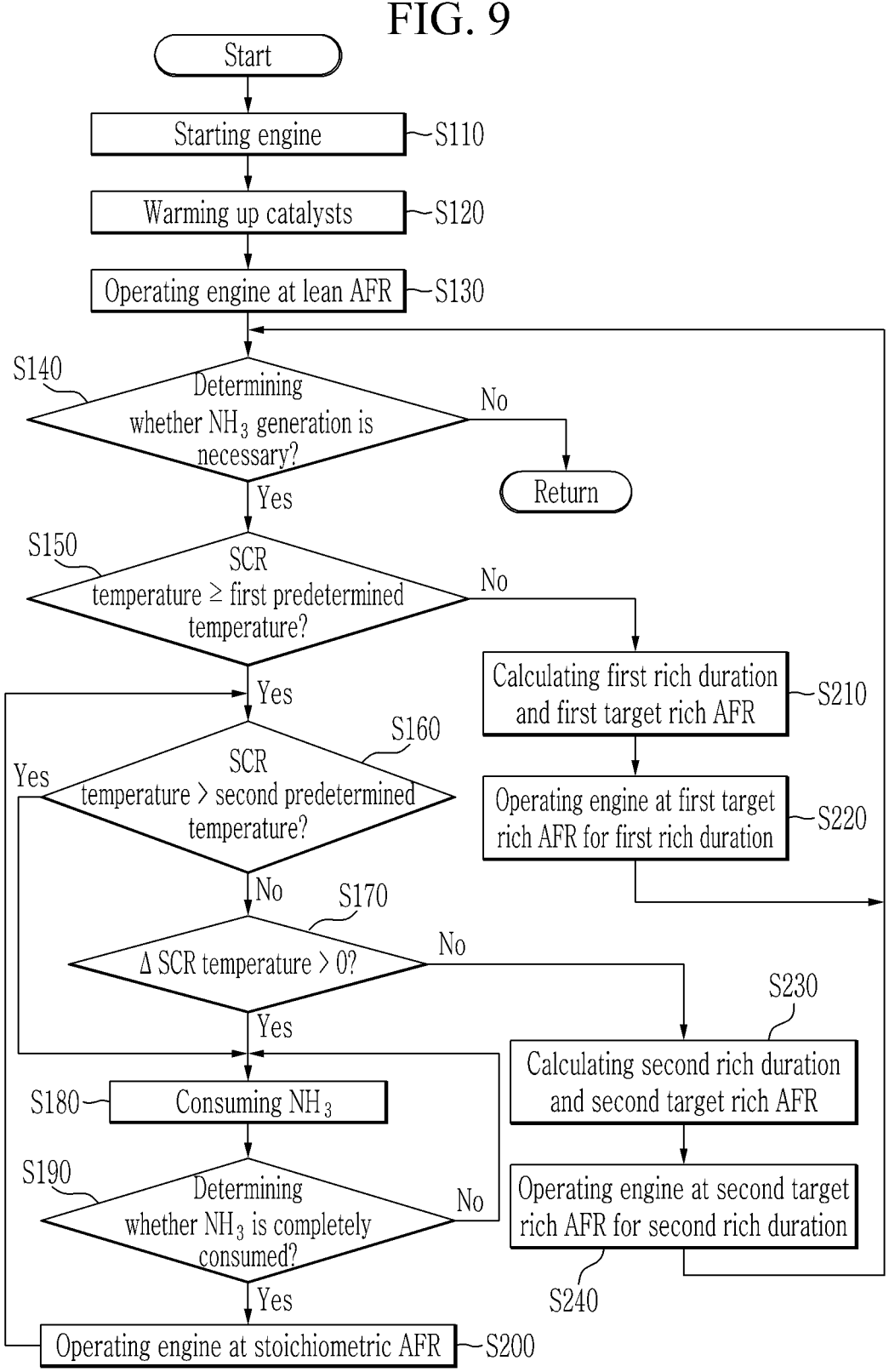
FIG. 9 is a flowchart of an after treatment method according to an aspect of the present disclosure.

FIG. 9 is a flowchart of an after treatment method according to an aspect of the present disclosure.

As shown in FIG. 9, when the engine 10 is started at step S110, the controller 90 calculates the temperatures of the catalysts 30, 40, 50 and 60. In order to carry out the after treatment method according to the aspect of the present disclosure, the catalysts 30, 40, 50 and 60 must be activated. Accordingly, the controller 90 warms up the catalysts 30, 40, 50 and 60 at step S120 if the catalysts 30, 40, 50 and 60 are not activated. That is, the ignition timing is delayed or the amount of the fuel injection is increased to increase the temperature of the exhaust gas.

When warming-up of the catalyst 30, 40, 50, and 60 is completed, the controller 90 operates the engine 10 at the lean AFR at step S130. Therefore, the TWC 30 purifies the CO and the HC contained in the exhaust gas and the particulate filter 40 collects the particulate matter contained in the exhaust gas. In addition, the SCR catalyst 50 reduces the NOx in the exhaust gas using the NH$_3$ stored therein.

After that, the controller 90 determines whether the NH$_3$ generation by the ammonia production catalyst module (e.g., TWC 30) is desired at step S140.

In order to determine whether the NH$_3$ generation is desired, the controller 90 calculates the amount of the NH$_3$ stored in the SCR catalyst 50. That is, the amount of the NH$_3$ stored in the SCR catalyst 50 is calculated based on operation history of the engine 10, temperature history of the SCR catalyst 50, and the like.

After that, the controller 90 determines whether the NH$_3$ generation is desired, that is, conversion to the rich AFR is desired based on the amount of the NH$_3$ stored in the SCR catalyst 50.

In one aspect, in order to determine whether the conversion to the rich AFR is necessary or desired, the controller 90 calculates the amount of the NOx to be flowed into the SCR catalyst 50. The amount of the NOx generated in the engine 10 is calculated based on a combustion state (e.g., a combustion temperature, a combustion pressure, the air amount, the fuel amount, etc.) of the engine 10, and the amount of the NOx slipped from the TWC 30 is calculated based on the AFR of the exhaust gas, the temperature of the TWC 30, etc.

Thereafter, the controller 90 determines whether the SCR catalyst 50 can purify the NOx. That is, it is determined whether the amount of the NH$_3$ stored in the SCR catalyst 50 is sufficient to purify the NOx flowing into the SCR catalyst 50. For example, if the amount of the NH$_3$ stored in the SCR catalyst 50 is greater than or equal to an amount of the NH$_3$ required to purify the NOx to be flowed into the SCR catalyst 50, the controller 90 determines that the SCR catalyst 50 can purify the NOx. On the contrary, if the amount of the NH$_3$ stored in the SCR catalyst 50 is less than the amount of the NH$_3$ required to purify the NOx to be flowed into the SCR catalyst 50, the controller 90 determines that the conversion to the rich AFR is desired, that is the NH$_3$ generation is desired.

In another aspect, in order to determine whether the conversion to the rich AFR is desired, the controller 90 determines whether the amount of the NH$_3$ stored in the SCR catalyst 50 is greater than or equal to a lower threshold of the NH$_3$. For example, if the amount of the NH$_3$ stored in the SCR catalyst 50 is greater than or equal to the lower threshold of the NH$_3$, the controller 90 determines that the conversion to the rich AFR is not desired. On the contrary, if the amount of the NH$_3$ stored in the SCR catalyst 50 is less than the lower threshold of the NH$_3$, the controller 90 determines that the conversion to the rich AFR is desired, that is the NH$_3$ generation is desired.

If it is determined at the step S140 that the NH$_3$ generation is desired, the controller 90 calculates or detects the temperature of the SCR catalyst 50. For example, the controller 90 calculates/detects the temperature of the SCR catalyst 50 based on the detected values of the first and second temperature sensors 62 and 64. After that, the controller 90 determines whether the temperature of the SCR catalyst 50 is higher than or equal to a first predetermined temperature at step S150. The first predetermined temperature is a temperature set for controlling the target NH$_3$ amount generated in the ammonia production catalyst module (for example, the TWC 30), and can be arbitrarily set by a person skilled in the art according to design intention. In one aspect, the first predetermined temperature may be 330° C. or higher and 370° C. or lower. In another aspect, the first predetermined temperature may be 350° C.

If the temperature of the SCR catalyst 50 is higher than or equal to the first predetermined temperature at the step S150, the controller 90 determines whether the temperature of the SCR catalyst 50 is higher than a second predetermined temperature at step S160. The second predetermined temperature is a temperature at which the NH$_3$ amount that can be stored in the SCR catalyst 50 becomes less than or equal to a lower limit, and can be set by a person skilled in the art according to the design intention. In one aspect, the second predetermined temperature may be 360° C. or higher and 420° C. or lower. In another aspect, the second predetermined temperature may be 400° C. Considering the design intention, the second predetermined temperature may be higher than the first predetermined temperature.

If the temperature of the SCR catalyst 50 is lower than or equal to the second predetermined temperature at the step S160, the controller 90 determines whether the temperature change rate of the SCR catalyst 50 is positive value at step S170.

If the temperature change rate of the SCR catalyst 50 is positive value at the step S170, the controller 90 controls the engine 10 such that the $NH_3$ stored in the SCR catalyst 50 is consumed at step S180. That is, the target $NH_3$ amount stored in the SCR catalyst 50 is 0. If the temperature change rate of the SCR catalyst 50 is positive value, the temperature of the SCR catalyst 50 is rising and may be higher than or equal to the second set temperature after a predetermined time elapses. In this case, the $NH_3$ stored in the SCR catalyst 50 can be slipped. In order to prevent or inhibit the $NH_3$ slip, the controller 90 operates the engine 10 at the lean AFR to inhibit $NH_3$ from being generated in the ammonia production catalyst module, and consumes the $NH_3$ stored in the SCR catalyst 50 in advance. As a result, the NOx contained in the exhaust gas is purified.

After that, the controller 90 determines whether the $NH_3$ stored in the SCR catalyst 50 is completely consumed at step S190.

If the $NH_3$ stored in the SCR catalyst 50 is not consumed completely at the step S190, the controller 90 returns to the step S180 and continues to consume the $NH_3$ stored in the SCR catalyst 50.

If it is determined at the step S190 that the $NH_3$ stored in the SCR catalyst 50 is completely consumed, the controller 90 operates the engine 10 at the stoichiometric AFR ($\lambda=1$) at step S200. Therefore, the TWC 30 can purify the CO, the HC, and the NOx in the exhaust gas. After that, the controller 90 returns to the step S160.

Meanwhile, if the temperature of the SCR catalyst 50 is higher than the second predetermined temperature at the step S160, the controller 90 proceeds to the step S180. If the temperature of the SCR catalyst 50 is higher than the second predetermined temperature, the $NH_3$ stored in the SCR catalyst 50 can be slipped. In order to prevent or inhibit $NH_3$ slip, the controller 90 operates the engine 10 at the lean AFR to inhibit $NH_3$ from being generated in the ammonia production catalyst module, and consumes the $NH_3$ stored in the SCR catalyst 50 in advance.

If the temperature of the SCR catalyst 50 is lower than the first predetermined temperature at the step S150, the controller 90 calculates a first rich duration and a first target rich AFR for generating the $NH_3$ at step S210. The first rich duration and the first target rich AFR are calculated such that the $NH_3$ amount stored in the SCR catalyst 50 becomes a first target $NH_3$ amount. That is, if the engine 10 is operated at the first target rich AFR for the first rich duration, the first target $NH_3$ amount is stored in the SCR catalyst 50. The first target $NH_3$ amount may be between 10% and 50% of a maximum amount of the $NH_3$ that can be stored in the SCR catalyst 50 at the first predetermined temperature. Although a current temperature of the SCR catalyst 50 is lower than the first predetermined temperature, the temperature of the SCR catalyst 50 may become higher than the first predetermined temperature due to change of driving conditions. Therefore, in order to inhibit or prevent the $NH_3$ slip from the SCR catalyst 50, the first target $NH_3$ amount may be set to 50% or less of the maximum amount of the $NH_3$ that can be stored in the SCR catalyst 50 at the first predetermined temperature. If the first target $NH_3$ amount is set to less than 10% of the maximum amount of the $NH_3$ that can be stored in the SCR catalyst 50 at the first predetermined temperature, a duration for which the lean AFR can be maintained becomes very short and the AFR is frequently converted into the rich AFR. In this case, the fuel mileage may be deteriorated.

The first target rich AFR may be 0.97 that is slightly rich AFR, but is not limited thereto. In addition, the first rich duration can be calculated according to the first target rich AFR and the temperature of the CUC 60. CO purification capacity of the CUC 60 varies with the temperature of the CUC 60. In order to reduce the CO discharged to the exterior of the vehicle, the first rich duration may be calculated according to the CO purification capacity of the CUC 60. That is, the first rich duration can be calculated according to the first target rich AFR and the temperature of the CUC 60.

If the first rich duration and the first target rich AFR are calculated at the step S210, the controller 90 operates the engine 10 at the first target rich AFR for the first rich duration at step S220. That is, the first target $NH_3$ amount is stored in the SCR catalyst 50 by operating the engine 10 at the first target rich AFR for the first rich duration.

After that, the controller 90 returns to the step S140 to determine whether the $NH_3$ generation is desired. If it is determined that the $NH_3$ generation is not desired, the after treatment method will be terminated at the step S140.

Meanwhile, if the temperature change rate of the SCR catalyst 50 is not positive value at the step S170, the controller 90 calculates a second rich duration and a second target rich AFR for generating the $NH_3$ at step S230. If the temperature change rate of the SCR catalyst 50 is not positive value, the temperature of the SCR catalyst 50 does not change or falls. In this case, a certain amount of the $NH_3$ is stored in the SCR catalyst 50 in order to prepare to enter the lean AFR at a temperature of the SCR catalyst 50 lower than the first predetermined temperature.

The second rich duration and the second target rich AFR are calculated such that the $NH_3$ amount stored in the SCR catalyst 50 becomes a second target $NH_3$ amount. That is, if the engine 10 is operated at the second target rich AFR for the second rich duration, the second target $NH_3$ amount is stored in the SCR catalyst 50. Since the temperature of the SCR catalyst 50 may rise again, the second target $NH_3$ amount may be less than the first target $NH_3$ amount. For example, the second target $NH_3$ amount may be 40%-60% of the first target $NH_3$ amount, but is not limited thereto.

The second target rich AFR may be 0.97 that is slightly rich AFR, but is not limited thereto. In addition, the second rich duration may be calculated according to the second target rich AFR and the temperature of the CUC 60.

If the second rich duration and the second target rich AFR are calculated at the step S230, the controller 90 operates the engine 10 at the second target rich AFR for the second rich duration at step S240. That is, the second target NH3 amount is stored in the SCR catalyst 50 by operating the engine 10 at the second target rich AFR for the second rich duration.

After that, the controller 90 returns to the step S140 to determine whether the $NH_3$ generation is desired. If it is determined that the $NH_3$ generation is not desired, the after treatment method will be terminated at the step S140.

(Test Method)

The TWC 30, the GPF 40, the SCR catalyst 50, and the CUC 60 are sequentially disposed on the exhaust pipe 20.

After that, 2.0 L, 4-cylinders, lean-burn gasoline engine is connected to the exhaust pipe 20 and aging treatment is performed. The aging treatment is carried out at 1,000° C. on the TWC 30 basis for 50 hours.

After the aging process, the engine 10 is operated at a mode in which FTP mode and US06 mode are combined. Here, the FTP mode and the US06 mode are predetermined exhaust gas test modes and are well known to those skilled in the art.

Hereinafter, performance of the after treatment method according to the Examples of the present disclosure will be compared with performance of various Comparative Examples.

EXAMPLES

The first predetermined temperature and the second predetermined temperature according to various Examples and Comparative Examples are set as shown in [Table 1].

TABLE 1

|  | First predetermined temperature(° C.) | Second predetermined temperature(° C.) |
|---|---|---|
| Comparative Example 1 | — | — |
| Example 1 | 350 | 400 |
| Comparative Example 2 | 310 | 400 |
| Example 2 | 330 | 400 |
| Example 3 | 370 | 400 |
| Comparative Example 3 | 390 | 400 |
| Example 4 | 350 | 360 |
| Example 5 | 350 | 380 |
| Example 6 | 350 | 420 |
| Comparative Example 4 | 350 | 440 |

In the after treatment method according to Comparative Example 1, if the $NH_3$ generation is desired, the engine 10 is operated at the rich AFR regardless of the temperature and the temperature change rate of the SCR catalyst 50 such that the TWC 30 generates the $NH_3$. Particularly, the engine 10 is operated at the first target rich AFR for the first rich duration so that first target $NH_3$ amount is stored in the SCR catalyst 50

In Comparative Example 2 to Comparative Example 4 and Example 1 to Example 6, the after treatment method illustrated in FIG. 9 is performed.

Figure 10:
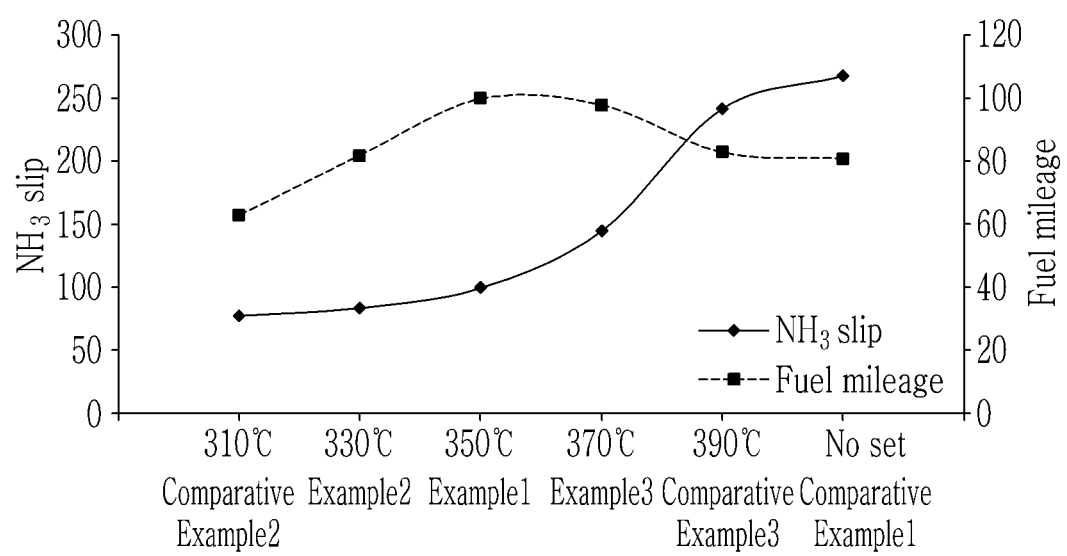
FIG. 10 is a graph illustrating a relative slip amount of $NH_3$ and a relative fuel mileage according to a first predetermined temperature.
Figure 11:
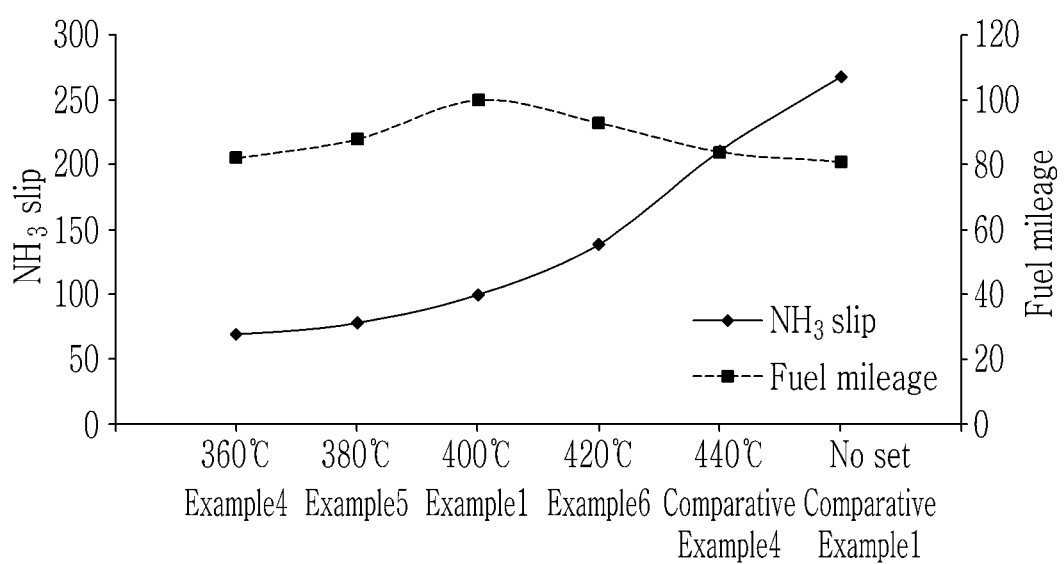
FIG. 11 is a graph illustrating a relative slip amount of $NH_3$ and a relative fuel mileage according to a second predetermined temperature.

FIG. 10 is a graph illustrating a relative slip amount of $NH_3$ and a relative fuel mileage according to a first predetermined temperature; and FIG. 11 is a graph illustrating a relative slip amount of $NH_3$ and a relative fuel mileage according to a second predetermined temperature.

In FIG. 10 and FIG. 11, a solid line represents the $NH_3$ amount slipped from the SCR catalyst 50, and a dotted line represents a fuel mileage. Particularly, FIG. 10 and FIG. 11 show relative values of the $NH_3$ amount slipped from the SCR catalyst 50 and the fuel mileage in each Example and each Comparative Example to the $NH_3$ amount slipped from the SCR catalyst 50 and the fuel mileage in Example 1. In Example 1, the $NH_3$ amount slipped from the SCR catalyst 50 and the fuel mileage are represented as 100, respectively.

Referring to FIG. 10, when the first predetermined temperature is 310° C. (in Comparative Example 2), the $NH_3$ amount slipped from the SCR catalyst 50 is small, but fuel mileage is low. That is, if the first predetermined temperature is low, it is significantly restricted to enter steps for generating the $NH_3$ (for example, the steps S210 and S220 in FIG. 9), and the $NH_3$ amount stored in the SCR catalyst 50 is small. In this case, the controller 90 cannot operate the engine 10 at the lean AFR and operates the engine 10 at the stoichiometric AFR. Therefore, the fuel mileage is reduced.

On the contrary, if the first predetermined temperature is 390° C. (in Comparative Example 3) or the first predetermined temperature is not set (in Comparative Example 1), the $NH_3$ amount slipped from the SCR catalyst 50 is large and the fuel mileage is also low. That is, if the first predetermined temperature is high, it frequently enters the steps for generating the $NH_3$ (for example, the steps S210 and S220 in FIG. 9) to generate a sufficient amount of the $NH_3$ in the ammonia production catalyst module, but the generated $NH_3$ is not stored in the SCR catalyst 50 and is slipped from the SCR catalyst 50 due to high temperature of the SCR catalyst 50. In this case, the controller 90 frequently operates the engine 10 at the rich AFR in order to store the first target $NH_3$ amount in the SCR catalyst 50. Therefore, the fuel mileage is reduced.

In order to improve the fuel mileage while reducing the $NH_3$ amount slipped from the SCR catalyst 50, the first predetermined temperature may be 330° C. or higher and 370° C. or lower in one aspect. In another aspect, the first predetermined temperature may be 350° C.

Referring to FIG. 11, if the second predetermined temperature is 440° C. (in Comparative Example 4) or the second predetermined temperature is not set (in Comparative Example 1), the $NH_3$ amount slipped from the SCR catalyst 50 is large and the fuel mileage is also low. That is, if the second predetermined temperature is high, it frequently enters the steps for generating the $NH_3$ (for example, the steps S210 and S220 in FIG. 9) to generate a sufficient amount of the $NH_3$ in the ammonia production catalyst module, but the generated $NH_3$ is not stored in the SCR catalyst 50 and is slipped from the SCR catalyst 50 due to high temperature of the SCR catalyst 50. In this case, the controller 90 frequently operates the engine 10 at the rich AFR in order to store the second target $NH_3$ amount in the SCR catalyst 50. Therefore, the fuel mileage is reduced.

On the contrary, if the second predetermined temperature is less than 360° C., the $NH_3$ amount slipped from the SCR catalyst 50 is small, but fuel mileage is low. That is, if the second predetermined temperature is low, it is significantly restricted to enter steps for generating the $NH_3$ (for example, the steps S210 and S220 in FIG. 9), and the $NH_3$ amount stored in the SCR catalyst 50 is small. In this case, the controller 90 cannot operate the engine 10 at the lean AFR and operates the engine 10 at the stoichiometric AFR. Therefore, the fuel mileage is reduced.

In order to improve the fuel mileage while reducing the $NH_3$ amount slipped from the SCR catalyst 50, the first predetermined temperature may be 360° C. or higher and 420° C. or lower in one aspect. In another aspect, the second predetermined temperature may be 400° C. Considering the design intention, the second predetermined temperature may be higher than the first predetermined temperature. For example, the second predetermined temperature may be higher by 40° C. to 60° C. than the first predetermined temperature.

While this disclosure has been described in connection with what is presently considered to be practical aspects, it is to be understood that the disclosure is not limited to the disclosed aspects. On the contrary, it is intended to cover various modifications and equivalent arrangements included within the spirit and scope of the appended claims.

What is claimed is:

1. An after treatment system for a lean-burn engine, comprising:
 an exhaust pipe connected to the lean-burn engine and through which an exhaust gas generated in the lean-burn engine flows;
 an ammonia production catalyst module mounted on the exhaust pipe, capable of purifying emission contained in the exhaust gas, and generating ammonia ($NH_3$) using nitrogen oxide (NOx) contained in the exhaust gas or the NOx stored therein at a rich air/fuel ratio (AFR);
 a selective catalytic reduction (SCR) catalyst mounted on the exhaust pipe downstream of the ammonia production catalyst module, storing the $NH_3$ generated in the ammonia production catalyst module, and reducing the NOx contained in the exhaust gas using the stored $NH_3$; and
 a controller detecting information on the AFR and temperature of the exhaust gas and controlling the AFR of the exhaust gas based on the information on the AFR and the temperature of the exhaust gas,
 wherein the controller controls a rich duration and a target rich AFR such that a target $NH_3$ amount is stored in the SCR catalyst in response to detecting that $NH_3$ generation is desired, and
 wherein the target NH3 amount is controlled according to a temperature and a temperature change rate of the SCR catalyst.

2. The after treatment system of claim 1, wherein the target $NH_3$ amount is a first target $NH_3$ amount if the temperature of the SCR catalyst is lower than a first predetermined temperature.

3. The after treatment system of claim 2, wherein the first target $NH_3$ amount is between 10% and 50% of a maximum amount of the $NH_3$ that can be stored in the SCR catalyst at the first predetermined temperature.

4. The after treatment system of claim 2, wherein the target $NH_3$ amount is a second target $NH_3$ amount that is less than the first target $NH_3$ amount if the temperature of the SCR catalyst is higher than or equal to the first predetermined temperature and is lower than a second predetermined temperature and the temperature change rate of the SCR catalyst is 0 or negative value.

5. The after treatment system of claim 4, wherein the second target $NH_3$ amount is 40%-60% of the first target $NH_3$ amount.

6. The after treatment system of claim 4, wherein the target $NH_3$ amount is 0 if the temperature of the SCR catalyst is higher than or equal to the first predetermined temperature and is lower than the second predetermined temperature and the temperature change rate of the SCR catalyst is positive value, or the temperature of the SCR catalyst is higher than or equal to the second predetermined temperature.

7. The after treatment system of claim 6, wherein the controller operates the engine at a stoichiometric AFR if the $NH_3$ amount stored in the SCR catalyst becomes 0.

8. The after treatment system of claim 1, wherein the ammonia production catalyst module includes at least one of a three-way catalyst (TWC), an ammonia production catalyst (APC), an additional TWC, and a lean NOx trap catalyst.

9. The after treatment system of claim 1, further comprising a particulate filter mounted on the exhaust pipe and trapping particulate matter in the exhaust gas.

10. The after treatment system of claim 1, further comprising a CO clean-up catalyst (CUC) mounted on the exhaust pipe downstream of the SCR catalyst and purifying carbon monoxide (CO) in the exhaust gas.

11. An after treatment method for controlling an after treatment system sequentially equipped with an ammonia production catalyst module, a selective catalytic reduction (SCR) catalyst, and a CO clean-up catalyst (CUC) on an exhaust pipe through which an exhaust gas flows and which is connected to a lean-burn engine, the after treatment method comprising:
 determining whether $NH_3$ generation is desired;
 determining whether a temperature of the SCR catalyst is higher than or equal to a first predetermined temperature and is lower than a second predetermined temperature if the $NH_3$ generation is desired;
 determining whether a temperature change rate of the SCR catalyst is positive value if the temperature of the SCR catalyst is higher than or equal to the first predetermined temperature and is lower than the second predetermined temperature; and
 consuming completely the $NH_3$ stored in the SCR catalyst and operating the engine at a stoichiometric AFR if the temperature change rate of the SCR catalyst is positive value.

12. The after treatment method of claim 11, if the temperature of the SCR catalyst is lower than the first predetermined temperature, further comprising:
 calculating a first rich duration for which a rich AFR is maintained and a first target rich AFR; and
 operating the engine at the first target rich AFR for the first rich duration.

13. The after treatment method of claim 12, wherein the $NH_3$ amount stored in the SCR catalyst becomes a first target $NH_3$ amount if the engine is operated at the first target rich AFR for the first rich duration.

14. The after treatment method of claim 13, wherein the first target $NH_3$ amount is between 10% and 50% of a maximum amount of the $NH_3$ that can be stored in the SCR catalyst at the first predetermined temperature.

15. The after treatment system of claim 13, if the temperature of the SCR catalyst is higher than or equal to the first predetermined temperature and is lower than the second predetermined temperature and the temperature change rate of the SCR catalyst is 0 or negative value, further comprising:
 calculating a second rich duration for which the rich AFR is maintained and a second target rich AFR; and
 operating the engine at the second target rich AFR for the second rich duration.

16. The after treatment method of claim 15, wherein the $NH_3$ amount stored in the SCR catalyst becomes a second target $NH_3$ amount that is less than the first target $NH_3$ amount if the engine is operated at the second target rich AFR for the second rich duration.

17. The after treatment method of claim 16, wherein the second target $NH_3$ amount is 40%-60% of the first target $NH_3$ amount.

18. The after treatment method of claim 15, wherein the second rich duration is calculated according to the second target rich AFR and a temperature of the CUC.

19. The after treatment method of claim 12, wherein the first rich duration is calculated according to the first target rich AFR and a temperature of the CUC.

* * * * *